Figure 1:
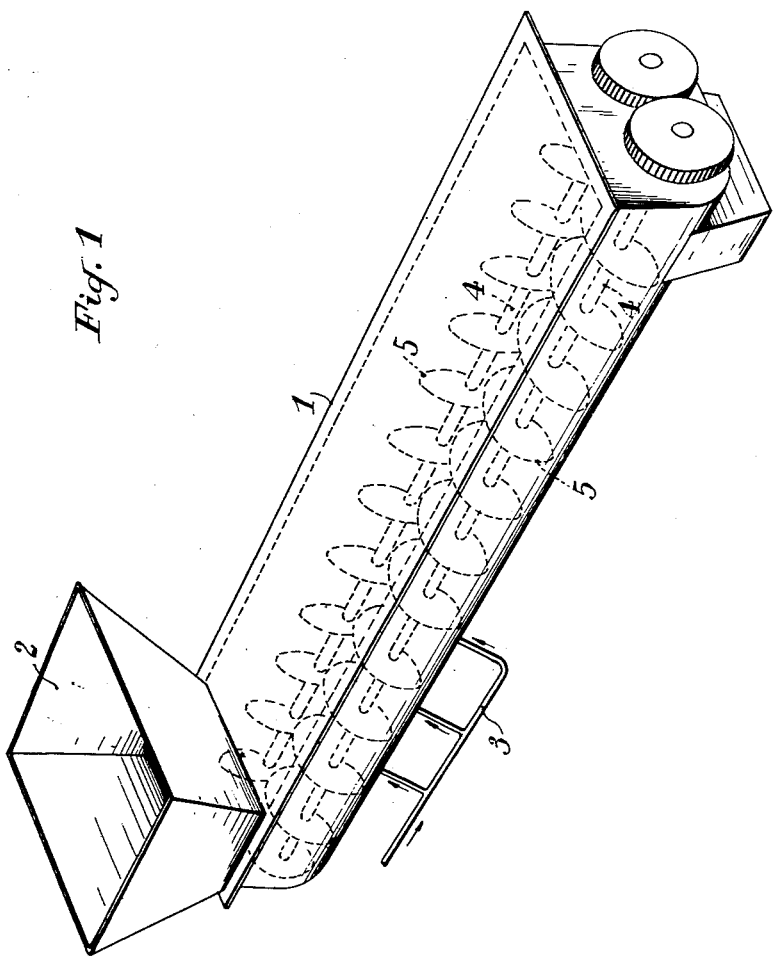

March 20, 1962  J. H. TAPIN  3,026,192
MANUFACTURE OF COMPLEX FERTILIZERS
Filed April 10, 1958  2 Sheets-Sheet 1

INVENTOR
JEAN HENRI TAPIN
BY Curtis, Morris & Safford
ATTORNEYS

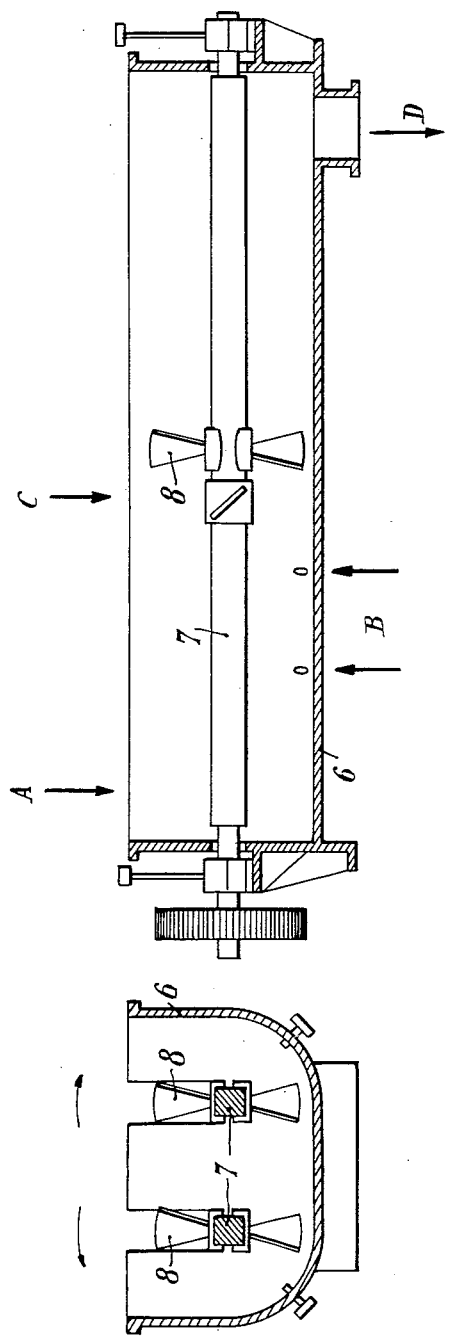

United States Patent Office 3,026,192
Patented Mar. 20, 1962

---

3,026,192
MANUFACTURE OF COMPLEX FERTILIZERS
Jean Henri Tapin, Feuchy-Lez-Arras, France, assignor to Societe de Produits Chimiques et Engrais d'Auby, Paris, France, a corporation of France
Filed Apr. 10, 1958, Ser. No. 727,576
Claims priority, application France Oct. 7, 1957
7 Claims. (Cl. 71—43)

The present invention relates to the improvement of conditions of manufacture of complex fertilizers.

It is well known that fertilizers are manufactured from natural phosphates, in which the $P_2O_5$ is made soluble by nitric acid (or a mixture of nitric, phosphoric or sulphuric acids) in order to render it assimilable by plants.

In the case of treatment by nitric acid alone, the solubilization of the natural phosphate can be shown schematically by the reaction:

(1) 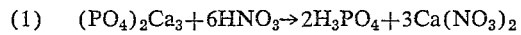

$$(PO_4)_2Ca_3 + 6HNO_3 \rightarrow 2H_3PO_4 + 3Ca(NO_3)_2$$

It is current practice to effect the neutralization of complex fertilizers. It is in fact well known that the latter normally have an acid reaction which adversely affects the efficiency of the fertilizer. It is also known that the neutralizing agent must be introduced with care in order to avoid the formation of insoluble phosphates of lime, by hydrolysis of the di-calcium phosphate, the hydrolysis being effected in the presence of small quantities of water or by de-hydration of di-calcium phosphate, this de-hydration taking place in the vicinity of 75° C.

It is also known that the most frequently employed neutralizing agent is ammonia, either pure and liquified or dissolved in water, or in the form of a solution, or again in the form of a solid salt, for example acid ammonium carbonate.

The neutralizing operation can be represented by the following chemical equation:

(2) 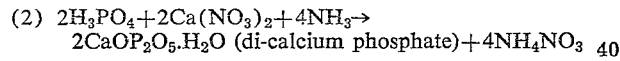

$$2H_3PO_4 + 2Ca(NO_3)_2 + 4NH_3 \rightarrow 2CaOP_2O_5 \cdot H_2O \text{ (di-calcium phosphate)} + 4NH_4NO_3$$

This Reaction 2 is fairly strongly exothermic, and the first difficulty is found precisely in the control of this exothermic action.

A suitable temperature which does not exceed 75°–80° C. must in fact be maintained in the mass of the reaction, in order to prevent, beyond this thermal threshold, the retrogression of the di-calcium phosphate to insoluble tri-calcium phosphate.

A further difficulty also results from the progressive thickening of the pasty mass as the reaction proceeds, as a result of the precipitation of di-calcium phosphate. This presents a serious problem with regard to the control of output and of distribution of the neutralizing fluid, especially at the end of the operation, since at this moment, the speed of fixation of the ammonia becomes extremely low. Under these conditions, care must be taken to avoid, on the one hand local excess quantities of reactant which cause retrogression of the $P_2O_5$, and on the other hand losses of $NH_3$ gas by leakage from the reaction zone.

For all these reasons, neutralization by liquid or gaseous ammonia of complex fertilizers necessitates the use of bulky and complicated apparatus, the capital cost of which is often very high.

The present invention has for its object a process which does not have any of the drawbacks referred to above.

The improvement which characterizes this process consists in super-saturating the fertilizers with ammonia in the powdered state, and in using the product obtained to carry out the neutralization of the acid fertilizer paste, directly and without special precautions.

The expression "fertilizer in the powdered state" implies particularly, but not restrictively, finely-powdered finished fertilizer obtained by the usual methods.

Whatever method of manufacture is employed for this powder, the granular size of which is not satisfactory for commercial sale, the powders are necessarily re-cycled during manufacture, after their separation by screening from the commercial product.

The method in accordance with the invention thus consists essentially in using, for the neutralizing ammonia, a solid vehicle which already possesses in itself the exact composition of the finished fertilizer.

The applicant's method—which is thus applied to a product which is already neutralized, since it is derived from the cycle of manufacture—is distinguished by this feature from the usual methods.

It will be recalled that for a commercial production of ten tons per hour, it is essential to re-cycle during manufacture, for example 8 to 10 tons per hour of powder.

In accordance with the invention, the supersaturation of these powders, which will hereinafter be termed "fines," is carried out in an apparatus known per se and shown in perspective view in FIG. 1 of the accompanying drawings.

This apparatus is constituted by a trough 1 in which the fertilizer fines—instead of being directly re-cycled into the manufacture—are continuously fed-in by means of a hopper 2, and the ammonia in the liquid or gaseous state is supplied through the injectors 3. In this trough are mounted one or a number of hollow shafts 4, rotating in synchronism and provided with helical blades 5 which are also hollow. Inside these shafts and also inside the blades is circulated a cooling fluid such as water or brine.

It should be observed that this type of apparatus is well suited to the conditions defined, in which the super-saturation is possible and effective, that is to say: the uniformity of the mass of reaction, ensured by a slow and regular stirring action which facilitates contact of the solid phase with the gaseous phase, and the maintenance of a uniform temperature in the vicinity of the ambient temperature, over the whole length of the apparatus. It should also be noted that the previous cooling of the fines is unnecessary, since cooling is ensured by the apparatus itself provided that the latter is dimensioned in such a way that the exchange surface is sufficient to ensure the heat balance.

In the case where liquid ammonia is used, the heat of vaporization contributes generally to this heat balance. The risk of any excessive local concentration of ammonia is obviated, since the apparatus ensures a uniform temperature through the entire mass of powder which is worked.

The absorption of the ammonia is such that it is unnecessary to provide any recovery system; the closure of the trough by a cover is sufficient to avoid losses due to sweeping of air over the super-saturated product.

In accordance with the invention, the powdered material super-saturated with ammonia, passing out of the apparatus, is then employed to neutralize the acid fertilizer paste which has been subjected to treatment by nitric acid alone or mixed with phosphoric or sulphuric acid. The neutralization is carried out directly and without special precautions in a very simple apparatus, for example of the type of standard mixers, similar to those which are used in the manufacture of super phosphate or ammonium nitrate.

FIGS. 2 and 3 of the accompanying drawings show an apparatus of this kind in transverse and longitudinal cross-section respectively, the apparatus being constituted by a vat 6 in which rotate in synchronism—for example at 60 r.p.m.— two shafts 7 which are provided with blades 8 over their entire length.

The paste is introduced into this vat at A.

In accordance with another essential feature of the present invention, the addition of ammonia for neutralizing the acid paste of the complex fertilizers is effected in a mixed manner: liquid-solid, or gas-solid, under the following conditions:

The injection of ammonia in the liquid form (or in the gaseous form when so desired) is effected at the beginning of the reaction—that is to say at B—and it is strictly limited to the amount which can be readily injected into the paste and fixed by the paste in the apparatus considered. This first period of neutralization does not require any recovery system for the ammonia, and does not have any of the known drawbacks which are characteristic of the methods based on complete neutralization of the paste by the exclusive use of a volatile base: liquid or gaseous ammonia; it is known that the main drawbacks are the losses of ammonia, the retrogression of the $P_2O_5$ and the complexity and the bulk of the apparatus.

The method of operation is as follows:

The acid paste for treatment of the phosphate, after elimination of the excess calcium nitrate, by the necessary quantity of ammonium sulphate, passes into the neutralizing mixer.

The liquid or gaseous ammonia is brought in under pressure by known controlled means, at the base of the mixer, where it is distributed into the paste through injectors of a standard type, judiciously arranged on the bottom of the trough of the apparatus. In the case where the ammonia is injected in the liquid state, its vaporization absorbs heat which is favourable to the heat balance of the reaction. The quantity of ammonia thus injected corresponds to about half the total necessary for neutralization.

The second period, that is to say the final period, of the neutralization is effected at C by the solid neutralizing agent which is constituted by the fines, super-saturated with ammonia, obtained from the apparatus shown in FIG. 1. The neutralized paste is evacuated from the apparatus at D.

The neutralized product then passes by gravity into a second mixer identical with the first, but strongly ventilated, in which there is produced a certain evaporation of water and a first cooling stage.

The neutralized fertilizer, partly cooled, then passes into a granulator-drier of the usual type.

The method of neutralization of complex fertilizers which has just been described is especially suitable for the production of the most highly-concentrated forms: It has been seen that the paste is exclusively neutralized by ammonia introduced partly in the liquid or gaseous state, and partly in the form of a solid neutralizing agent constituted by the fertilizer fines which are usually recycled, but which in this case are super-saturated with ammonia.

It is quite clear that this method of complete neutralization by ammonia can be applied in all cases, and in particular even for the manufacture of formulae of relatively low concentration which normally require the incorporation of inert materials. This process can, by virtue of its flexibility, be actually adapted within the scope of the invention to all the formulae of fertilizers desired.

For example, in the case of formulae of medium concentration, the super-saturated fines can be partly relayed by using conjointly a second solid neutralizing agent, for example Thomas basic slags, which will be introduced, like the fines, at C into the neutralizing mixer. These slags have the following advantages in respect of the desired neutralizing action:

By their excess of free lime, they have a fairly strong basic reaction with respect to the acidity of the paste of complex fertilizers (6 to 7 kgs. of slag have the same neutralizing action as 1 kg. of ammonia).

They supply $P_2O_5$ to the fertilizer, of which one part is also found in the finished product in a soluble form, which is of appreciable value. The percentage of $P_2O_5$ in the slags sold commercially on the French market, for example, varies between 16 and 19%.

Finally, they bring to the complex fertilizer oligo-elements (especially manganese) the agricultural value of which does not require any demonstration.

The proportion of slags with respect to the super-saturated fines will naturally vary in accordance with the formulae desired. It is however necessary to avoid coming too near to the total elimination of these fines, for the following reasons.

Supposing, for the sake of clearness of description, that the neutralization of the fertilizer is entirely effected by means of basic slags without the use of liquid or gaseous ammonia and of fines super-saturated with ammonia, the reaction of neutralization of the acid paste may then be written as follows:

(3)    $2H_3PO_4 + P_2O_5 4CaO \longrightarrow 2P_2O_5 2CaOH_2O + H_2O$
           Slags           Di-calcium phosphate It should be observed that in this case, it is necessary to eliminate before the neutralization, the whole of the calcium nitrate by ammonium sulphate, in accordance with Reaction 4 below, otherwise the slags would directly attack $H_3PO_4$, and all the calcium nitrate would remain in the fertilizer, this being a well known disadvantage.

(4)    $3Ca(NO_3)_2 + 3Am_2SO_4 \rightarrow 3CaSO_4 + 6NO_3NH_4$

Now it is known that when ammonia is used exclusively for the neutralization, there is eliminated with the ammonium sulphate only the quantity of $Ca(NO_3)_2$ which is in excess in the fertilizer with respect to that which can be converted to bi-calcium phosphate during the course of the neutralization of the acid paste. In this case, the reactions of elimination of the $Ca(NO_3)_2$ and of neutralization are as follows:

(5)    $Ca(NO_3)_2 + Am_2SO_4 \rightarrow CaSO_4 + 2NH_4NO_3$
(6)    $2H_3PO_4 + 2Ca(NO_3)_2 + 4NH_3 \rightarrow$
                                     $P_2O_5 2CaOH_2O + 4NH_4NO_3$ If both ammonia and slags are used at the same time for the neutralization, the quantity of ammonium sulphate necessary for the elimination of the excess $Ca(NO_3)_2$ is thus located half way between the requirements of Reaction 5 and those of Reaction 4.

For 100 kgs. of phosphate treated, these requirements being practically and respectively 40 kgs. for total neutralization with ammonia and 100 kgs. for total neutralization with slags, the quantity of ammonium sulphate necessary when the mixed neutralization process of ammonia and slag is used will be situated in the vicinity of 70 kgs.

With respect to complete neutralization by ammonia, this mixed neutralization by ammonia and slag thus introduces into the complex fertilizer a larger quantity of constituents which have only small concentrations of fertilizing elements (20.4% of nitrogen in the ammonium sulphate and 18% of phosphorous pentoxide in the slag). This can thus be a drawback if it is desired to manufacture fertilizers which are relatively concentrated in fertilizing elements and especially in nitrogen.

In this way, the advantages of the method of neutralization are clearly shown, these resting on the conjoint action of liquid or gaseous ammonia and fines super-saturated with ammonia and enabling, depending on the concentration of the fertilizer desired and according to local economic conditions, a variable quantity of slag to be employed at will and introduced into the neutralizing mixer, the amount of this addition being capable of reduction to zero while remaining within the essential scope of the method in accordance with the invention.

This method is thus general, and the addition of basic slag for the neutralization is a supplementary feature.

The following examples will clearly demonstrate the flexibility of application of this method.

In order to facilitate comparison, the figures given below have been based in every case on the treatment of 100 kgs. of acid paste at the input side of the neutralizing mixer.

Example 1

Formula 11.5–9.50–10.40 (N, $P_2O_5$, $K_2O$)

For 100 kgs. of acid paste prepared from 21.3 kgs. of Moroccan phosphate, 18.2 kgs. of nitric acid counted at 100% $HNO_3$, 23.5 kgs. of ammonium sulphate, 1.8 kgs. of ammonium phosphate, 17.2 kgs. of potassium chloride and 3.2 kgs. of ammonium nitrate, the neutralization is carried out in the mixer in the following manner:

0.730 kg. of ammonia is injected through the injectors at the inlet of the apparatus,
10 kgs. of Thomas slag at 18% of $P_2O_5$ is then added,
100 kgs. of finished re-cycled fertilizer powder is then introduced after passing through the super-saturation apparatus in which there is fixed 0.730 kg. of ammonia.

There is finally obtained a completely neutralized fertilizer which has the following analysis after drying and granulation:

4.55% of nitric nitrogen,
6.85% of ammoniacal nitrogen,
9.65% of $P_2O_5$,
10.40% of $K_2O$, and
3.0% of water.

The sequence of the operations of manufacture and in particular the neutralization, can be shown diagrammatically by the following analytical table:

| Sequence of operations | Nitric nitrogen | Ammoniacal nitrogen | $P_2O_5$ | $K_2O$ | $H_2O$ |
|---|---|---|---|---|---|
| 100 kgs. of acid paste at the inlet of the mixer contain, in kgs. | 4.60 | 5.72 | 7.77 | 10.30 | 14.8 |
| After injection of 0.73 kg. of ammonia, the partly neutralized paste contains in kgs. | 4.60 | 6.32 | 7.77 | 10.30 | 14.8 |
| After the addition of 10 kgs. of slag there is obtained 110.73 kgs. of paste containing (neglecting the water evaporated during neutralization) | 4.60 | 6.32 | 9.57 | 10.30 | 14.8 |
| to which there is added 100 kgs. of re-cycled finished product on which is fixed 0.73 kg. of ammonia in the super-saturation apparatus, and containing, in kgs. | 4.60 | 7.52 | 9.57 | 10.30 | 3.34 |
| There is finally obtained at the inlet of the dryer-granulator 211.46 kgs. of product containing, in kgs. | 9.20 | 13.84 | 19.14 | 20.60 | 18.14 |
| After drying, there are obtained 200 kgs. of finished product containing, in kgs. | 9.20 | 13.84 | 19.14 | 20.60 | 6.68 |
| of which 100 kgs. are re-cycled, and 100 kgs. are sent to storage and contain, in kgs. | 4.60 | 6.92 | 9.57 | 10.30 | 3.34 |

Example 2

Formula 10–10–18

For 100 kgs. of acid paste passed into the neutralizing mixer and prepared from 25.5 kgs. of Moroccan phosphate, 20 kgs. of $HNO_3$ (base 100% $HNO_3$), 12 kgs. of $Am_2SO_4$ and 26.5 kgs. of KCl, the neutralization was carried out in the following way.

1.22 kgs. of anhydrous $NH_3$ was injected into the neutralizing mixer.

Into this apparatus was re-cycled 87 kgs. of finished fertilizer powder on which is fixed 1.22 kgs. of $NH_3$ in the super-saturation apparatus.

There was obtained a suitably neutralized fertilizer which, after drying and granulating, gave the following analysis:

5% of nitric nitrogen,
5% of ammoniacal nitrogen, and
18% of $K_2O$.

The sequence of operations can be shown in the following analytical form:

| Sequence of operations | Nitric nitrogen | Ammoniacal nitrogen | $P_2O_5$ | $K_2O$ | $H_2O$ |
|---|---|---|---|---|---|
| 100 kgs. of acid paste at the inlet of the mixer contain, in kgs. | 4.40 | 2.40 | 8.70 | 15.90 | 16.0 |
| After injection of 1.22 kgs. of $NH_3$, this paste contains, in kgs. | 4.40 | 3.40 | 8.70 | 15.70 | 16.0 |
| To this is added 87 kgs. of finished product re-cycled through the ammonia treatment apparatus, and having fixed 1.22 kgs. of $NH_3$. These 88.22 kgs. of super-saturated product contain, in kgs. | 4.40 | 5.40 | 8.70 | 15.90 | 0.56 |
| There is finally obtained before drying and granulation, 189.44 kgs. of neutralized product, which contain, in kgs. | 8.80 | 8.80 | 17.40 | 31.80 | 16.56 |
| After drying and granulation, there are obtained 174 kgs. containing | 8.80 | 8.80 | 17.40 | 31.80 | 1.12 |
| of which 87 kgs. are re-cycled and 87 kgs. are sent to the sales store, with the analysis, percent | 5.50 | 5.05 | 10.0 | 18.2 | 0.56 |

The main advantage of this method of neutralization of complex fertilizers is that it uses the fertilizer itself as a neutralizing agent, so that this agent has already the desired formula. Its action thus has no repercussion on the analysis of the fertilizer, which gives the possibility of a better regulation, since no inert product is introduced to reduce the concentrations. Thus all the advantages of concentrated ammonia are retained without any of their drawbacks.

What I claim is:

1. In a method for the preparation of a complex fertilizer material of the character described by the solubilizing of insoluble natural calcium phosphates in an acid digestion step and then neutralizing acidic products of said digestion step while avoiding high temperature and concentration conditions tending to convert said solubilized phosphates to insoluble form during said neutralizing, the steps which comprise digesting said insoluble calcium phosphates with a mineral acid reactant selected from the group consisting of nitric acid, mixtures of nitric and sulphuric acids, and mixtures of nitric and phosphoric acids for solubilizing said phosphates to form an acid fertilizer paste containing water-soluble $P_2O_5$ and calcium nitrate, partially neutralizing said acid fertilizer paste by adding thereto ammonia in an amount no more than about 50% of that which would completely neutralize said acid fertilizer paste, continuously admixing said ammonia through said acid fertilizer paste during said partial neutralizing step and maintaining the temperature thereof at less than about 75° C. for avoiding temperature and ammonia concentration conditions tending to cause complete neutralization of said fertilizer paste and conversion of said solubilized phosphates therein to insoluble form, ceasing to add said ammonia to said acid fertilizer paste after said partial neutralizing step and prior to complete neutralization of said paste, admixing in a separate step additional ammonia with a portion of said complex fertilizer material previously produced in a previous cycle of this method for affixing said additional ammonia thereto, thereafter completing the neutralization of said acid fertilizer paste in a second neutralizing step by admixing therewith said portion of said previously produced complex fertilizer material with said additional ammonia affixed thereon, and thereafter separating said thus completely neutralized fertilizer paste into one portion for use as said finished complex fertilizer product of this method and another portion for admixture into said second neutralizing step of a subsequent cycle of this method with said additional ammonia affixed thereon.

2. In a method of preparing a complex fertilizer material including calcium nitrate and $P_2O_5$ components in substantially neutralized and water-soluble form by the neutralization of an acid fertilizer paste resulting from solubilizing acid digestion of insoluble calcium phosphates with an acid reactant including nitric acid, the steps which comprise adding to said acid fertilizer paste ammonia in an amount limited to about 50% of that necessary for complete neutralization of said acid paste, admixing said added ammonia with said acid fertilizer paste in a partial neutralizing step and maintaining the temperature therein at no more than about 75° C. for avoiding temperature and ammonia concentration conditions in said partial neutralizing step tending to cause conversion of solubilized components in said paste to insoluble form, admixing in a separate step additional ammonia with a portion of said complex fertilizer material previously produced in a previous cycle of this method for affixing said additional ammonia thereto, thereafter completing the neutralization of said acid fertilizer paste in a second neutralizing step by admixing therewith said portion of said previously produced complex fertilizer material with said additional ammonia affixed thereon, and thereafter separating said thus completely neutralized fertilizer paste into one portion for use as said finished complex fertilizer product of this method and another portion for admixture into said second neutralizing step of a subsequent cycle of this method with said additional ammonia affixed thereon.

3. A method as recited in claim 2 in which said portion of finished complex fertilizer material and said other portion for admixture into said second neutralizing step each comprises about 50% by weight of said completely neutralizer fertilizer material separated in said separating step.

4. A method as recited in claim 2 in which said second neutralizing step also includes the addition of an alkaline slag material of a composition different than said previously produced complex fertilizer material with said ammonia affixed thereon, at least a portion of the calcium nitrate formed in said digestion being eliminated prior to the addition of said slag material in said second neutralizing step.

5. A method as recited in claim 2 in which said portion of complex fertilizer material added in said second neutralizing step has the same composition, prior to said addition of ammonia thereto, as said completely neutralized fertilizer paste.

6. A method as recited in claim 2 in which the quantity of ammonia affixed to said portion of previously produced complex fertilizer material added in said second neutralizing step in substantially in excess of that which combines with said material.

7. A method as recited in claim 2 in which the quantity of ammonia added in said second neutralizing step as affixed to said complex fertilizer material is less than that which causes chemical reaction with said water-soluble phosphates in said paste to form water-insoluble phosphorous compounds.

References Cited in the file of this patent
UNITED STATES PATENTS

| | | |
|---|---|---|
| 1,948,454 | Burdick | Feb. 20, 1934 |
| 2,598,658 | Procter et al. | May 27, 1952 |
| 2,656,266 | Calmeyer | Oct. 20, 1953 |
| 2,680,680 | Coleman | June 8, 1954 |
| 2,700,605 | Hornibrook | Jan. 25, 1955 |
| 2,837,418 | Seymour | June 3, 1958 |

UNITED STATES PATENT OFFICE
CERTIFICATE OF CORRECTION

Patent No. 3,026,192                                      March 20, 1962

Jean Henri Tapin

It is hereby certified that error appears in the above numbered patent requiring correction and that the said Letters Patent should read as corrected below.

Column 6, in the table, under the heading Nitric nitrogen, for "5.50" read -- 5.05 --.

Signed and sealed this 10th day of July 1962.

(SEAL)
Attest:

ERNEST W. SWIDER
Attesting Officer

DAVID L. LADD
Commissioner of Patents